United States Patent
Elliger

(10) Patent No.: US 12,265,861 B2
(45) Date of Patent: Apr. 1, 2025

(54) TRACING SERVICE INTERACTIONS WITHOUT GLOBAL TRANSACTION IDENTIFIERS

(71) Applicant: Amazon Technologies, Inc., Seattle, WA (US)

(72) Inventor: Felix Elliger, Teltow (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/399,078

(22) Filed: Dec. 28, 2023

(65) Prior Publication Data

US 2024/0126623 A1 Apr. 18, 2024

Related U.S. Application Data

(63) Continuation of application No. 17/105,264, filed on Nov. 25, 2020, now Pat. No. 11,893,428.

(51) Int. Cl.
*G06F 9/54* (2006.01)
*G06F 9/48* (2006.01)
(Continued)

(52) U.S. Cl.
CPC ............ *G06F 9/542* (2013.01); *G06F 9/4881* (2013.01); *G06Q 30/04* (2013.01); *G06Q 10/02* (2013.01);
(Continued)

(58) Field of Classification Search
None
See application file for complete search history.

(56) References Cited

U.S. PATENT DOCUMENTS

| 7,606,814 B2 | 10/2009 | Deily et al. |
| 8,601,443 B2 | 12/2013 | Barker et al. |
| (Continued) | | |

FOREIGN PATENT DOCUMENTS

| JP | 200018754 A * | 6/2000 | ............... G06F 11/30 |
| WO | WO 2010072158 A1 * | 7/2010 | ............... H04L 9/32 |
| WO | WO 2017070970 A1 * | 5/2017 | ............ H04L 47/125 |

OTHER PUBLICATIONS

Rodrigo Fonseca, et al., "X-Trace: A Pervasive Network Tracing Framework," 4th USENIX Symposium on Networked Systems Design & Implementation (NSDI'07), Apr. 2007, 14 Pages.
(Continued)

*Primary Examiner* — Charles E Anya
(74) *Attorney, Agent, or Firm* — Robert C. Kowert; Kowert, Hood, Munyon, Rankin & Goetzel, P.C.

(57) ABSTRACT

Methods, systems, and computer-readable media for tracing service interactions without global transaction identifiers are disclosed. A service monitoring system receives an event message from a first service in a service-oriented system. The event message comprises one or more elements of data from a body of a service request from an upstream service. The first service initiates a sub-task associated with the service request. The service monitoring system receives one or more additional event messages from one or more additional services. The additional event message(s) comprise one or more additional elements of data from one or more additional service requests associated with one or more additional sub-tasks. The service monitoring system determines, based (at least in part) on the element(s) of data in the event message and the additional element(s) of data in the additional event message(s), that the sub-task and the additional sub-task(s) are associated with a higher-level task.

19 Claims, 7 Drawing Sheets

(51) Int. Cl.
  *G06Q 10/02* (2012.01)
  *G06Q 10/0631* (2023.01)
  *G06Q 10/0639* (2023.01)
  *G06Q 10/10* (2023.01)
  *G06Q 20/12* (2012.01)
  *G06Q 30/04* (2012.01)
  *G06Q 30/0601* (2023.01)

(52) U.S. Cl.
  CPC ... *G06Q 10/06315* (2013.01); *G06Q 10/0639* (2013.01); *G06Q 10/10* (2013.01); *G06Q 20/127* (2013.01); *G06Q 30/0623* (2013.01); *G06Q 30/0633* (2013.01); *G06Q 30/0641* (2013.01)

(56) References Cited

U.S. PATENT DOCUMENTS

| | | |
|---|---|---|
| 8,738,759 B2 | 5/2014 | Patel |
| 9,210,056 B1* | 12/2015 | Choudhary ........... H04L 69/329 |
| 9,450,849 B1 | 9/2016 | Goldberg et al. |
| 9,684,524 B1 | 6/2017 | Porter et al. |
| 9,703,675 B2 | 7/2017 | Reid, III et al. |
| 9,912,566 B1 | 3/2018 | Penno et al. |
| 9,928,517 B1 | 3/2018 | Hitchcock et al. |
| 10,320,632 B1 | 6/2019 | McClintock et al. |
| 10,554,701 B1 | 2/2020 | Decker et al. |
| 10,686,568 B2 | 6/2020 | Elhaddad et al. |
| 10,764,186 B2 | 9/2020 | Goyal |
| 10,796,322 B1 | 10/2020 | Ramalingam et al. |
| 2016/0226736 A1* | 8/2016 | Tran .................... G06F 16/9024 |
| 2019/0089803 A1* | 3/2019 | Li ...................... G06F 9/44526 |
| 2020/0366574 A1* | 11/2020 | Schubert ............ H04L 41/5032 |

OTHER PUBLICATIONS

Benjamin H. Sigelman, et al., "Dapper, a Large-Scale Distributed Systems Tracing Infrastructure," Google Technical Report dapper-2010-1, Apr. 2010, 14 Pages.

U.S. Appl. No. 17/105,264, filed Nov. 25, 2020, Felix Elliger.

* cited by examiner

TRACING SERVICE INTERACTIONS WITHOUT GLOBAL TRANSACTION IDENTIFIERS

PRIORITY APPLICATION

This application is a continuation of U.S. patent application Ser. No. 17/105,264, filed Nov. 25, 2020, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. However, as the scale and scope of distributed systems have increased, the tasks of provisioning, administering, and managing the resources have become increasingly complicated.

Figure 1:
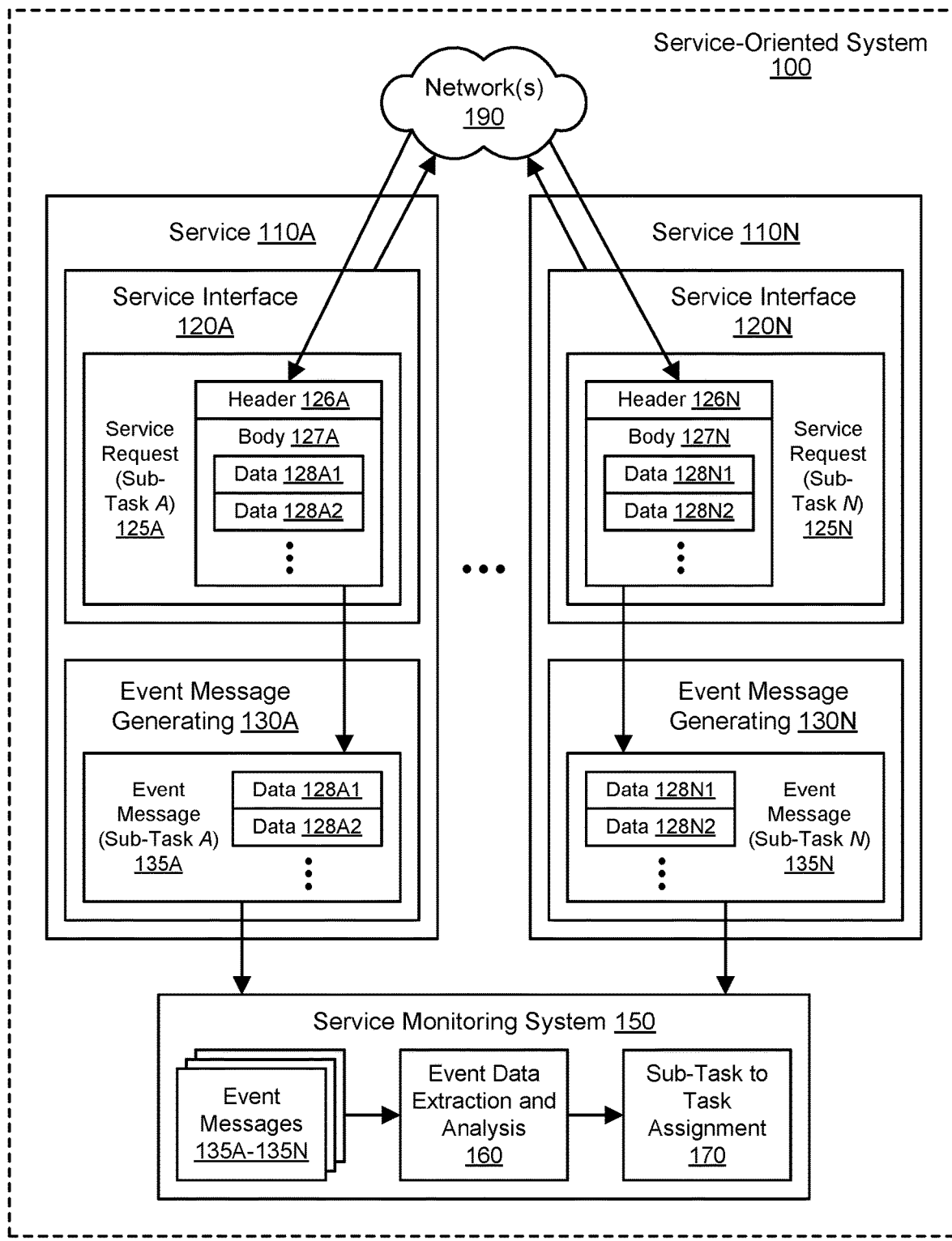
FIG. 1 illustrates an example system environment for tracing service interactions without global transaction identifiers, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for tracing service interactions without global transaction identifiers are described. In one embodiment, a service-oriented system includes a set of services that interact via service requests to collaborate and perform higher-level tasks. A particular higher-level task associated with a root request may involve numerous lower-level tasks or sub-tasks that are performed by downstream services. The individual sub-tasks may contribute to the final output of the higher-level task. Service owners and other system administrators may seek to determine relationships among services along with traffic metrics such as request processing latency. Service owners and other system administrators may also seek to determine the progress of relatively long-running tasks, e.g., by identifying the status of individual sub-tasks. Using prior approaches, individual requests were traced from one service to another by passing a global transaction identifier from service to service. However, due to constraints on time and resources, not all services were modified to participate in such a tracing system. Additionally, due to the overhead associated with such tracing techniques, oftentimes only a portion of requests could be traced, e.g., by sampling a percentage of root requests. Using prior approaches, monitoring the progress of a particular task was not always possible if the task was not traced due to sampling or if the task was not traced due to some services not propagating the global transaction identifier.

The aforementioned challenges, among others, are addressed by embodiments of the techniques described herein, whereby a centralized system traces service interactions for particular tasks without necessarily relying on global transaction identifiers. A service monitoring system may leverage the data model for a higher-level task to assign particular sub-tasks to a particular occurrence of the higher-level task. When a service receives a request to perform a sub-task, the service may send an event message to the service monitoring system. In some embodiments, a service may emit event messages when starting a sub-task and when completing a sub-task. An event message may be published for the benefit of a downstream service, but the service monitoring system may also obtain the event message. The event message may not include a global transaction identifier. The event message may include data from the body of the service request but not necessarily data from the header of the service request. For example, the event message may include data identifying a client account associated with a higher-level task, data identifying a transaction associated with a higher-level task, data identifying a timestamp associated with a higher-level task, other data usable as input to the sub-task, and so on. Using this event data, the service monitoring system may determine that individual tasks at multiple services are part of a particular higher-level task. In some embodiments, the service monitoring system may apply domain-specific or task-specific logic to extract relevant elements of data from event messages. In some embodiments, the service monitoring system may match elements of the data using patterns associated with a data model of the higher-level task. In some embodiments, the service monitoring system may combine two or more elements of data from an event message to identify the corresponding higher-level task. In some embodiments, the service monitoring system may reference an external data source (e.g., another service) to obtain additional data that can be used to assign sub-tasks to a higher-level task. By analyzing event messages emitted by services that do not necessarily propagate a global transaction identifier to other services, the service monitoring system may enable the progress of tasks (e.g., long-running tasks) to be monitored.

As one skilled in the art will appreciate in light of this disclosure, embodiments may be capable of achieving certain technical advantages, including some or all of the following: (1) improving the accuracy of service monitoring in a set of services that implement a service-oriented architecture without propagating global transaction identifiers; (2) reducing the use of computing resources that would be used to modify program code of services to propagate global transaction identifiers; (3) reducing the use of network resources by leveraging existing event messages instead of requiring all services to propagate global transaction identifiers from service to service and to a centralized monitoring system; and so on.

FIG. 1 illustrates an example system environment for tracing service interactions without global transaction identifiers, according to some embodiments. The example system environment may include a service-oriented system 100 with a plurality of services 110A-110N and a service monitoring system 150 that monitors aspects of the services 110A-110N. For example, the service monitoring system 150 may trace service interactions among services 110A-110N for particular tasks. The service-oriented system 100 may implement a service-oriented architecture and may include multiple services 110A-110N configured to communicate with each other (e.g., through message passing) to carry out various tasks. Although two services 110A and 110N are illustrated for purposes of example, it is contemplated that any suitable number and configuration of services may be used with the service-oriented system 100. One of services 110A-110N may represent an individual service host or a set of service hosts that implement the same service. The services 110A-110N may be implemented using a plurality of hosts, any of which may be implemented by the example computing device 600 illustrated in FIG. 6. The hosts may be located in any suitable number of data centers or geographical locations. In one embodiment, multiple services and/or instances of the same service may be implemented using the same host. It is contemplated that the service-oriented system 100 and/or and service monitoring system 150 may include additional components not shown, fewer components than shown, or different combinations, configurations, or quantities of the components shown.

Each service 110A-110N may be configured to perform one or more functions upon receiving a suitable request. For example, a service may be configured to retrieve input data from one or more storage locations and/or from a service request, transform or otherwise process the data, and generate output data. In some cases, a first service may call a second service, the second service may call a third service to satisfy the request from the first service, and so on. For example, to build a web page dynamically, numerous services may be invoked in a hierarchical manner to build various components of the web page. As another example, to build an invoice for resource usage for a particular client account with a cloud provider network, numerous services may be invoked in a hierarchical manner to build various components of the invoice. In some embodiments, services may be loosely coupled in order to minimize (or in some cases eliminate) interdependencies among services. This modularity may enable services to be reused in order to build various applications through a process referred to as orchestration. A service may include one or more components that may also participate in the service-oriented system, e.g., by passing messages to other services or to other components within the same service. A service may offer one or more application programming interfaces (APIs) or other programmatic interfaces through which another service may request the functionality of the service. Such a programmatic interface may be referred to as a service interface. As shown in FIG. 1, service 110A may include service interface 120A, and service 110N may include service interface 120N. In some embodiments, the service monitoring system 150 may determine trace service interactions at the granularity of individual APIs of services.

The service-oriented system 100 may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In yet another example, a computer system may submit a request for an invoice for resource usage for a particular client account with a cloud provider network. In general, services may be configured to perform any of a variety of processes.

The services 110A-110N described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services.

Figure 2:
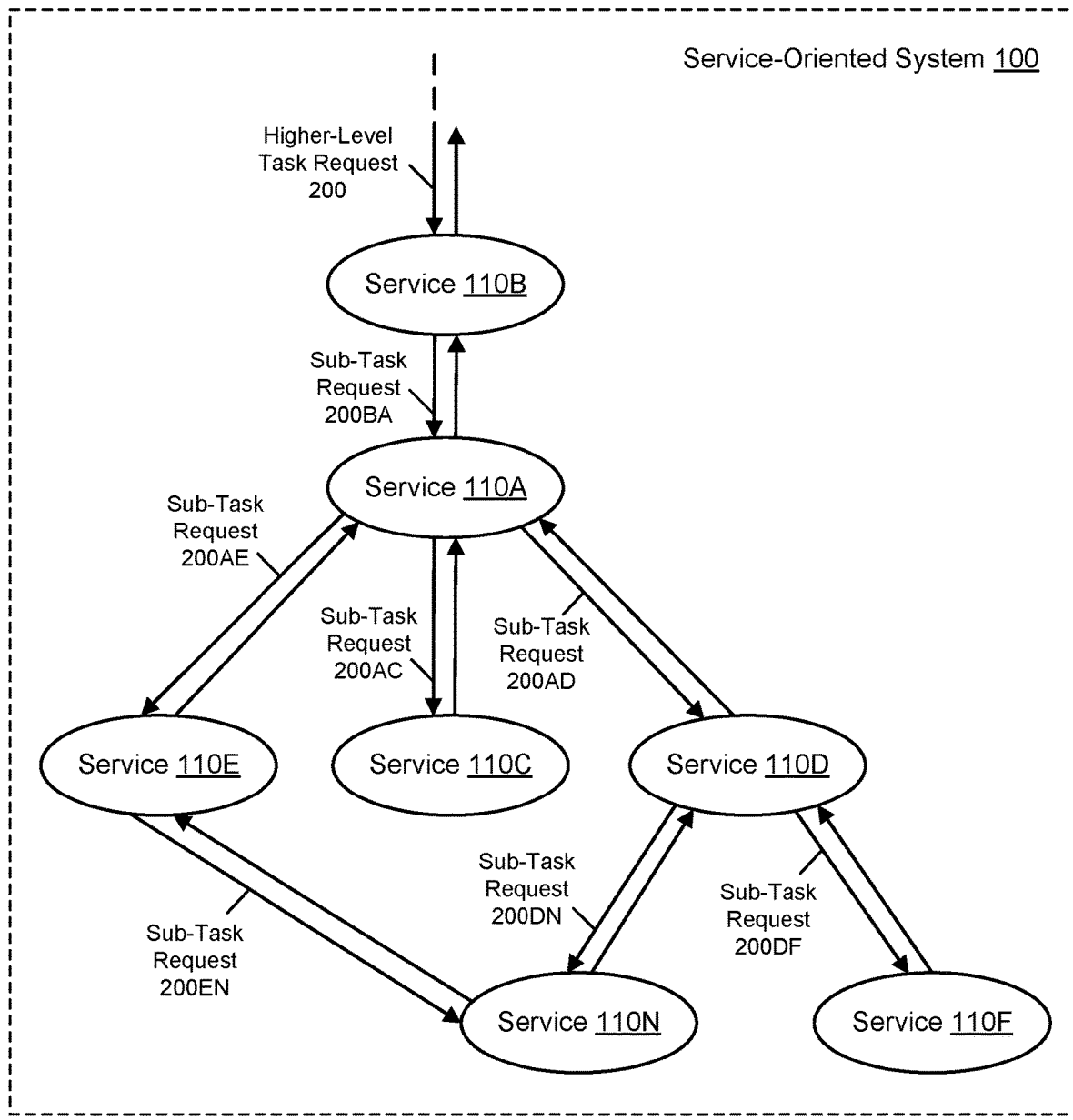
FIG. 2 illustrates further aspects of the example system environment for tracing service interactions without global transaction identifiers, including an example of a call graph for a set of services performing sub-tasks associated with a higher-level task, according to some embodiments.

Services may collaborate to perform tasks by sending requests to other services, e.g., via one or more networks 190. As shown in the example of FIG. 1, service 110A may include a service interface 120A for receiving inbound requests for sub-tasks from upstream services, generating responses to the upstream services for those service requests, generating outbound requests for other sub-tasks from downstream services, and receiving responses from the downstream services for those service requests. Similarly, service 110N may include a service interface 120N for receiving inbound requests for sub-tasks from upstream services, generating responses to the upstream services for those service requests, generating outbound requests for other sub-tasks from downstream services, and receiving responses from the downstream services for those service requests. An example of call paths using such requests is shown in FIG. 2.

Using the service interface 120A, the service 110A may receive a service request 125A for a particular sub-task A. The service request 125A may include a header 126A. The header 126A may include routing information for the request 125A, e.g., identifiers and/or addresses of the sending service (or a particular service host) and/or the recipient service (or a particular service host). In some embodiments, the header 126A may include a global transaction identifier that originates with a root request at an upstream service. However, the service monitoring system 150 may ignore such a global transaction identifier (if present) or assume that the identifier is not present in all service requests. The service request 125A may include a body 127A. The body 127A may include a payload of the request, e.g., data usable as input to the requested sub-task. The body 127A may include various elements of data 128A1, 128A2, and so on. For example, the body 127A may include data identifying a client account associated with the sub-task A (and/or the corresponding higher-level task), data identifying a transaction associated with the sub-task A (and/or the corresponding higher-level task), data identifying a category of sub-tasks associated with a category of higher-level tasks, data identifying a timestamp associated with the sub-task A (and/or the corresponding higher-level task), and so on. Similarly, the service 110N may receive a service request 125N for a particular sub-task N. The request 125N may include a header 126N and a body 127N with various elements of data 128N1, 128N2, and so on.

In some embodiments, services 110A-110N may generate event messages and provide the messages to the service monitoring system 150. As shown in FIG. 1, service 110A may include a component 130A for generating event messages such as message 135A, and service 110N may include a component 130N for generating event messages such as message 135N. In some embodiments, a service may generate an event message representing initiation of a sub-task when a request for a sub-task is received (e.g., request 125A or 125N) or when the service initiates the sub-task. In some embodiments, a service may generate an event message representing completion of the sub-task when the service completes the sub-task. An event message may be generated for the benefit of one or more downstream services, e.g., to assist the downstream services in performing their respective sub-tasks or portions of the higher-level task. However, the service monitoring system 150 may also obtain the event message 135A. In some embodiments, the service 110A may use a publish-subscribe paradigm to provide event message 135A to subscribers such as downstream services as well as the service monitoring system 150. In some embodiments, the service 110A may place the event message 135A in a message queue which subscribers can access.

An event message may include data from the body of the service request for the corresponding sub-task but not necessarily data from the header of the service request. As shown in the example of FIG. 1, an event message 135A may include a plurality of elements of data from the body 127A of the corresponding service request 125A, such as data 128A1, data 128A2, and so on. The body 127A may include data usable as input to the sub-task A. For example, the event message 135A may include data identifying a client account associated with the sub-task A and/or higher-level task, data identifying a transaction associated with the sub-task A and/or higher-level task, data identifying a category of sub-tasks associated with a category of higher-level tasks, data identifying a timestamp associated with the sub-task A and/or higher-level task, and so on. In some embodiments, the event message 135A may not include a global transaction identifier. In some embodiments, the event message 135A may include one or more elements of data from the header 126A of the corresponding service request 125A, potentially including a global transaction identifier, but the service monitoring system 150 may not use a global transaction identifier from the header 126A to perform assignment of sub-tasks to higher-level tasks even if the identifier is present in the event message.

The service monitoring system 150 may receive event messages 135A-135N, e.g., via the network(s) 190. In some embodiments, the service monitoring system 150 may receive event messages 135A-135N directly from services 110A-110N. In some embodiments, the service monitoring system 150 may receive event messages 135A-135N indirectly, e.g., via an event publishing service for which the system 150 subscribes to the event messages, or via a message queue to which the events are published. Using the event messages 135A-135N, the service monitoring system 150 may use a component 160 for event data extraction and analysis. In some embodiments, the event data extraction and analysis 160 may apply domain-specific or task-specific logic to extract relevant elements of data from event messages. The domain-specific or task-specific logic may be derived from the data model of a type or category of higher-level task. For example, the event data extraction and analysis 160 may use different logic for one higher-level task type of building web pages than for another higher-level task type of generating invoices for consumption of computing resources in a cloud provider network. Based (at least in part) on knowledge of the data model for a particular task type, the event data extraction and analysis 160 may look for particular types of data at particular locations within the event message. For example, if services 110A and 110N are known to be frequently involved in generating invoices for computing resource usage, then the event data extraction and analysis 160 may expect to find invoice identifiers and/or client account identifiers at particular locations in the event messages 135A and 135N.

In some embodiments, the event data extraction and analysis 160 may match elements of the data using patterns associated with a data model of the higher-level task. In some embodiments, the event data extraction and analysis 160 may transform one or more elements of data from an event message to identify the corresponding higher-level task. In some embodiments, the event data extraction and analysis 160 may combine two or more elements of data from an event message to identify the corresponding higher-level task. For example, a combination of a client account identifier and a timestamp may be used to uniquely associate a particular set of sub-tasks with an instance of a higher-level task. In some embodiments, the event data extraction and analysis 160 may reference an external data source (e.g., another service) to obtain additional data that can be used to assign sub-tasks to a higher-level task. In some embodiments, the event data extraction and analysis 160 may use one or more machine learning models to identify relevant elements of data in event messages 135A-135N.

Based on the extracted and analyzed event data, the service monitoring system 150 may then use a component 170 for sub-task to task assignment. The sub-task to task assignment 170 may assign particular sub-tasks to particular higher-level tasks. For example, for a higher-level task of building a web page dynamically, numerous sub-tasks that build various components of the web page may be determined by the system 150 to be components of the higher-level task. As another example, for a higher-level task of generating an invoice for resource usage within a cloud provider network, numerous sub-tasks that generate various components of the invoice may be determined by the system 150 to be components of the higher-level task. As yet another example, for a higher-level task of manufacturing an item, numerous sub-tasks that build various components of the item may be determined by the system 150 to be components of the higher-level task. In some embodiments, the sub-task to task assignment 170 may use one or more machine learning models to assign particular sub-tasks to particular higher-level tasks. By analyzing event messages emitted by services that do not necessarily propagate a global transaction identifier to other services, the service monitoring system 150 may enable the progress of tasks (e.g., long-running tasks) to be monitored.

In some embodiments, the service monitoring system 150 may perform additional analysis of service interactions and/or generate additional data describing the service interactions. In some embodiments, the service monitoring system 150 may generate one or more maps indicative of call paths and/or traffic metrics in the service-oriented system 100. The map(s) may indicate observed call paths, e.g., using dependency graphs that show a flow of requests and responses from service to service. The call paths may be generated for individual tasks or in the aggregate. The map(s) may indicate metrics such as call volume, latency, error rate or success rate, and so on for individual service hosts, fleets of service hosts for particular services, and/or sets of services. In some embodiments, the service monitoring system 150 may present visualizations of call paths for individual tasks or for sets of tasks, e.g., in a graphical user interface (GUI).

The service monitoring system 150 may generate one or more call graphs or service dependency graphs. Each call graph may represent the flow of requests from service (or API) to service (or API) and may identify service dependencies. Each call graph may include a plurality of nodes representing services or APIs and one or more edges (also referred to as call paths) representing service interactions. Each call graph may include a hierarchical data structure that includes nodes representing the services and edges representing the interactions. In some cases, a call graph may be a deep and broad tree with multiple branches each representing a series of related service calls.

In some embodiments, the service monitoring system 150 may use the event messages 135A-135N (or the event data derived therefrom) to perform additional analysis. For example, the service monitoring system 150 may use service metrics to assign resource usage values or costs for downstream service usage to root requests. As another example, the service monitoring system 150 may use the service metrics to predict demand in order to enable auto-scaling of computing resources used to implement services. As yet another example, the service monitoring system 150 may use the service metrics to detect traffic anomalies in call paths, including infrequently used call paths that might not be detected using sampling of requests. By capturing metrics for all (or nearly all) service interactions without relying on sampling techniques or global transaction identifiers, the system 150 may permit more accurate analysis of the service-oriented system 100.

In one embodiment, the service monitoring system 150 may determine one or more performance metrics based on the event messages 135A-135N. In one embodiment, the performance metrics may describe aspects of the performance of multiple service interactions, such as metrics representing aggregate performance, average performances, etc. For example, the event messages 135A-135N may indicate client-measured latencies for interactions, e.g., based on the time at which a request was sent by a service and also on the time at which a response to the request was received by the service. The event messages 135A-135N may indicate the server-measured latencies for an interaction based on the time at which a request was received by a service and also on the time at which a response to the request was sent by the service. The network transit time for the interaction may be calculated as the difference between the client-measured latency and the server-measured latency. Accordingly, the performance metrics may include average or aggregate transit time metrics (e.g., mean, median, etc.) for multiple service calls. Network transit times may be impacted by the number of network hops, the physical distance between hops, and the link quality between endpoints. In one embodiment, the performance metrics may describe aspects of the costs of performing or maintaining various interactions, services, instances of services, and/or hosts. For example, the cost may include elements of computing resource usage (e.g., processor usage, persistent storage usage, memory usage, etc.), energy consumption, heat production, and/or any other suitable cost element(s).

In one embodiment, such additional analysis may be performed by the system 150 using automated techniques, e.g., to generate reports outlining recommendations or identifying problems for system administrators. In one embodiment, the analysis may include scaling analysis that analyzes a map and determines whether a particular service should be scaled up or down. In one embodiment, the analysis may include root cause analysis that identifies one or more services or APIs as the root cause of a performance problem in the service-oriented system 100, e.g., a high latency for requested tasks, an excessive number of dropped requests or errors, and so on. In one embodiment, the analysis may include blast radius analysis that determines the impact of an outage at a particular service or API, e.g., on other services that tend to be in its call paths. In one embodiment, the analysis may include cost attribution analysis that determines a cost or resource usage value attributed to one service or API for tasks performed by another service or API.

Based (at least in part) on the scaling analysis, one or more services may be scaled manually or automatically. Scaling of a service may include increasing the number of instances (or nodes) that implement the service, decreasing the number of instances that implement the service, modifying the locations of service instances, and so on. Scaling may affect the performance of the service-oriented system 100. For example, the addition of a new service instance may reduce the number of requests handled by the existing instance and thus improve the availability of the existing instance and reduce the latency of its processing of requests. Conversely, if the scaling analysis indicates that a service is underutilized relative to its number of instances, then the number of instances may be reduced to achieve less waste in computing resources. In one embodiment, based (at least in part) on scaling analysis, the service-oriented system 100 may be optimized over time to adapt to changing conditions.

In one embodiment, at least a portion of the set of computing resources for a particular service may be automatically allocated from a pool of computing resources. The pool of computing resources may be managed by a resource manager associated with the service-oriented system 100. The pool may represent a plurality of computing resources which are available to various services in a service-oriented system 100, including the particular service. The pool may include a plurality of computing resources such as virtual compute instances that may be heterogeneous or homogeneous in their hardware capabilities and software configuration. The computing resources in the pool may be usable to provide or otherwise implement one or more services.

In one embodiment, the resource manager may manage a multi-tenant, cloud-based provider network that includes the computing resources used for scaling of services. The provider network may include numerous data centers hosting various resource pools, such as collections of physical and/or virtualized computer servers, storage devices, and networking equipment that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. In one embodiment, an operator of the provider network may implement a flexible set of resource reservation, control, and access interfaces for clients. For example, a provider network may implement a programmatic resource reservation interface (e.g., via a web site or a set of web pages) that allows clients to learn about, select, purchase access to, and/or reserve resources. Using such an interface, scaling analysis may allocate various computing resources to services for a period of time.

The service monitoring system 150 may be offered as a service to clients of the provider network. For example, the clients may represent users who seek to monitor the progress of individual tasks in their service-oriented systems. The service monitoring system 150 may include one or more computing devices, any of which may be implemented by the example computing device 600 illustrated in FIG. 6. In various embodiments, the functionality of the different services, components, and/or modules of the service monitoring system 150 may be provided by the same computing device or by different computing devices. If any of the various components of the service-oriented system 100 and/or service monitoring system 150 are implemented using different computing devices, then the respective computing devices may be communicatively coupled, e.g., via a network 190. In one embodiment, aspects of the service-oriented system 100 and/or service monitoring system 150 may be performed automatically and/or programmatically, e.g., by executing program instructions without direct user intervention to collect and/or analyze aggregate traffic metrics.

FIG. 2 illustrates further aspects of the example system environment for tracing service interactions without global transaction identifiers, including an example of a call graph for a set of services performing sub-tasks associated with a higher-level task, according to some embodiments. As discussed above, services may collaborate to perform higher-level tasks by sending requests to other services, e.g., along various routes. A route may correspond to a set of call paths between services or APIs. The call paths may represent inbound service requests and outbound service requests relative to a particular service or API. To process a given received request, one or more services may be invoked. As used herein, an initial request may be referred to as the "root request." The root request may represent a higher-level task request 200 that can be implemented using numerous lower-level tasks or sub-tasks at various services. In various embodiments, the root request 200 may but need not originate from a computer system outside of the service-oriented system 100. In many embodiments, a root request 200 may be processed by an initial service, which may then call APIs of one or more other services. Additionally, each of those services may also call APIs of one or more other services, and so on until the root request 200 is completely fulfilled. The particular services or APIs called to fulfill a request may be represented as a call graph that specifies, for each particular service or API of multiple services or APIs called to fulfill the same root request, the service or API that called the particular service or API and any services or APIs called by the particular service or API.

From the perspective of a particular service, any service that calls the particular service may be referred to as a "parent service" or "upstream service." Furthermore, from the perspective of a particular service, any service that the particular service calls may be referred to as a "child service" or "downstream service." In a similar fashion, from the perspective of a particular request, any request from which the particular request stems may be referred to as a "parent request." Furthermore, from the perspective of a particular request, any request stemming from the particular request may be referred to as a "child request." Additionally, as used herein the phrases "request," "call," "service request" and "service call" may be used interchangeably. A request to a service may represent a request to an API of that service. Note that this terminology refers to the nature of the propagation of a particular request throughout the present system and is not intended to limit the physical configuration of the services. As may sometimes be the case with service-oriented architectures employing modularity, each service may in some embodiments be independent of other services in the service-oriented system 100 (e.g., the source code of services or their underlying components may be configured such that interdependencies among source and/or machine code are not present).

An example hierarchy of call paths in a dependency graph is illustrated in FIG. 2. In one embodiment, an initial request 200 to an upstream service may result in a route through numerous downstream services in the service-oriented system 100 in order to satisfy the initial request. The route may correspond to one or more call paths between services. The call paths may represent inbound service requests and outbound service requests relative to a particular service. To process a given received request, one or more services may be invoked. As used herein, an initial request 200 for a higher-level task may be referred to as the "root request." In various embodiments, the root request 200 may but need not originate from a computer system outside of the service-oriented system 100. In many embodiments, a root request 200 may be processed by an initial service such as service 110B, which may then call one or more other services such as service 110A. Additionally, each of those services may also call one or more other services, and so on until the root request is completely fulfilled.

The particular services called to fulfill a request may correspond to a call graph that includes, for each particular service of multiple services called to fulfill the same root request, the service that called the particular service and any services called by the particular service. In the example call graph of FIG. 2, the root request 200 may be provided to a service 110B, which may then call a downstream service 110A with a sub-task request 200BA to satisfy that root request. The service 110A may then call additional downstream services 110E, 110C, and 110D with respective sub-task requests 200AE, 200AC, and 200AD. The service 110A may potentially wait for responses from those downstream services before responding to the request 200BA from the upstream service 110B. Similarly, the service 110D may call additional downstream services 110N and 110F with a sub-task request 200DN and 200DF and potentially wait for responses from those services before responding to the request from the upstream service 110A. As shown in the example of FIG. 2, the service 110E may also call service 110N with a sub-task request 200EN.

Ultimately the service 110B may provide a response to the requesting entity based on a flow of responses from downstream services. For example, if the root request 200 represents a request to view a product detail page in an online marketplace, then the various downstream services 110A, 110E, 110C, 110D, 110N, and 110F may collaborate to build that page dynamically with their respective sub-tasks, and the service 110B may then provide the page to the client that issued the root request. As another example, if the root request 200 represents a request to generate an invoice for resource usage by a client account in a provider network, then the various downstream services 110A, 110E, 110C, 110D, 110N, and 110F may collaborate to build that invoice dynamically with their respective sub-tasks, and the service 110B may then provide the completed invoice to the client that issued the root request. As described herein, the service monitoring system 150 may use automated techniques (e.g., event data extraction and analysis 160) to assign various sub-tasks to a particular higher-level task.

Figure 3A:
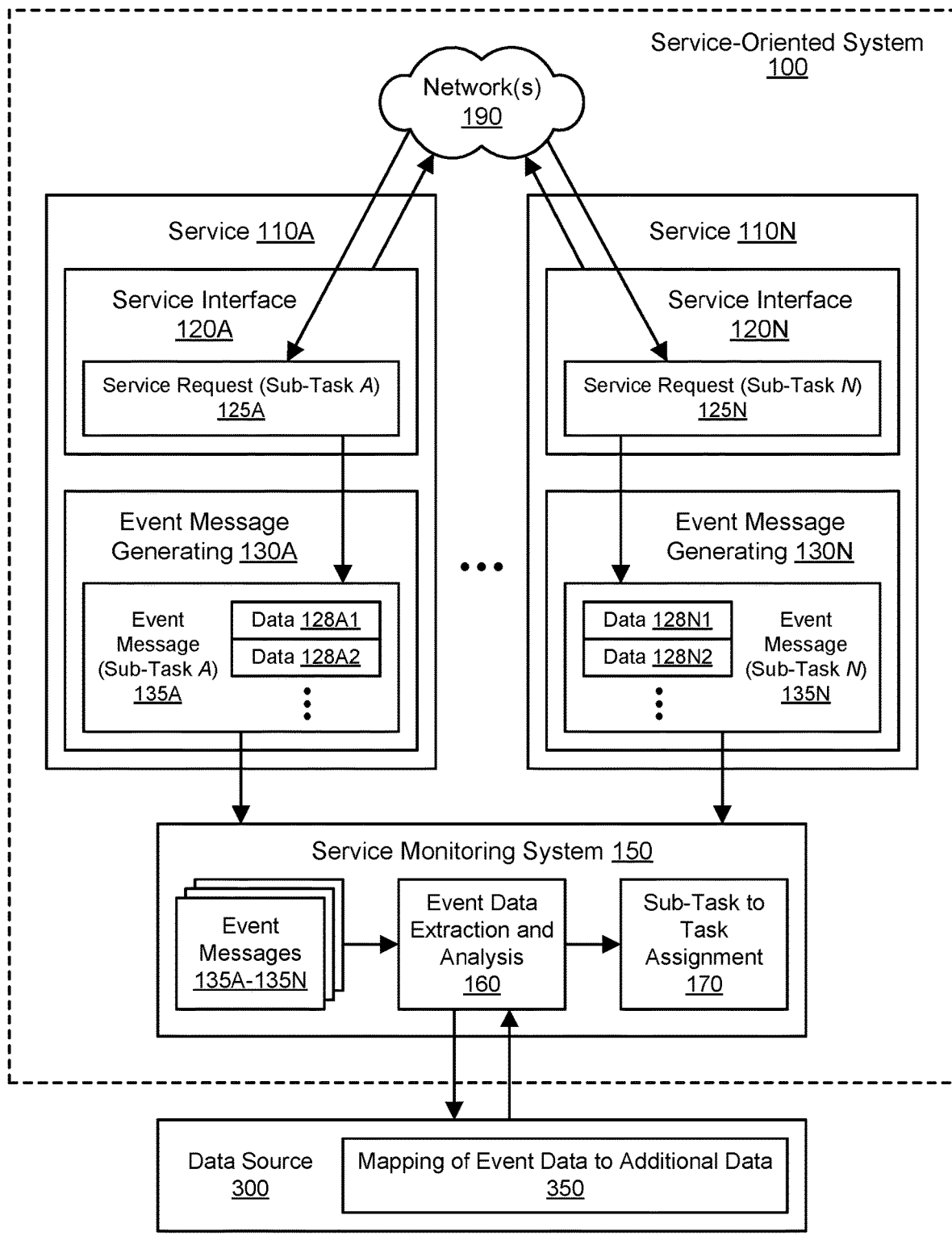
FIG. 3A illustrates further aspects of the example system environment for tracing service interactions without global transaction identifiers, including the use of an external data source to obtain additional data for assignment of sub-tasks to higher-level tasks, according to some embodiments.

FIG. 3A illustrates further aspects of the example system environment for tracing service interactions without global transaction identifiers, including the use of an external data source to obtain additional data for assignment of sub-tasks to higher-level tasks, according to some embodiments. In some embodiments, the event data extraction and analysis 160 may reference an external data source 300 to obtain additional data that can be used to assign sub-tasks to a higher-level task. The data source 300 may represent a database or table, data store, data repository, and so on. As shown in the example of FIG. 3A, the data source 300 may be outside the service-oriented system 100. In some embodiments, the data source 300 may be implemented inside the service-oriented system 100. The data source 300 may store or maintain additional data that can be mapped or correlated to event data extracted from event messages. The additional data derived from the data source 300 may provide a context for individual sub-tasks or their event data. The data source 300 and/or system 150 may perform mapping 350 of event data to additional data. For example, if the event data includes a client identifier, then the data source 300 may include a table that associates particular bill identifiers with particular account identifiers, and the mapping 350 may return a particular account identifier when supplied with a particular bill identifier. Based (at least in part) on this additional data, the system 150 may perform sub-task to task assignment 170. For example, by using one or more bill identifiers in event messages 135A-135N to obtain a corresponding account identifier from the external data source 300, the system 150 may assign the sub-tasks for those event messages to a higher-level task of generating an invoice with the particular account identifier.

Figure 3B:
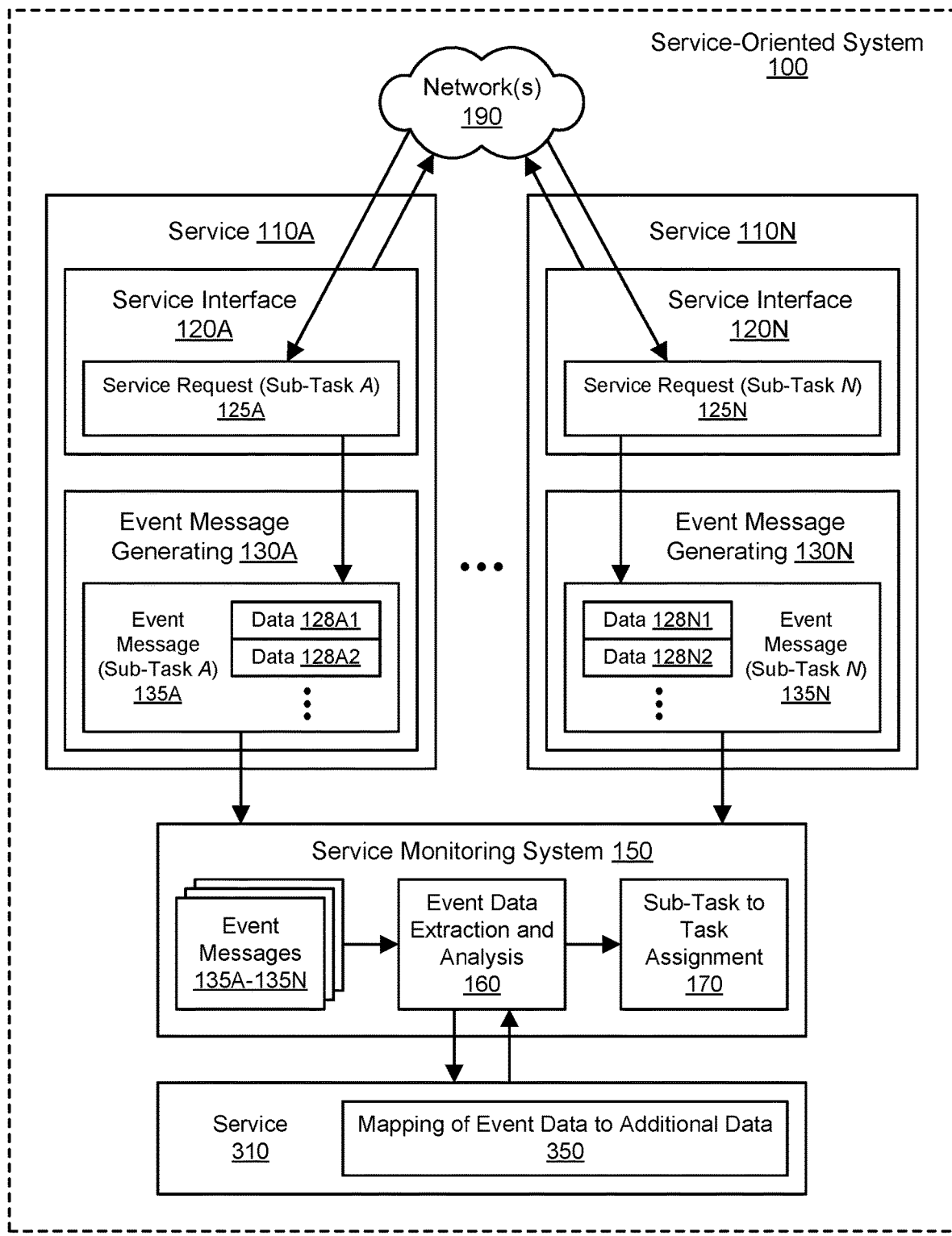
FIG. 3B illustrates further aspects of the example system environment for tracing service interactions without global transaction identifiers, including the use of another service to obtain additional data for assignment of sub-tasks to higher-level tasks, according to some embodiments.

FIG. 3B illustrates further aspects of the example system environment for tracing service interactions without global transaction identifiers, including the use of another service to obtain additional data for assignment of sub-tasks to higher-level tasks, according to some embodiments. In some embodiments, the event data extraction and analysis 160 may reference an additional service 310 to obtain additional data that can be used to assign sub-tasks to a higher-level task. The service 310 may represent a database service, storage service, and so on. As shown in the example of FIG. 3B, the service 310 may be part of the service-oriented system 100 and may include one or more service interfaces by which the system 150 can request additional data and/or event data mapping 350. The service 310 may store or maintain additional data that can be mapped or correlated to event data extracted from event messages. The additional data derived from the data source 300 may provide a context for individual sub-tasks or their event data. The service 310 and/or system 150 may perform mapping 350 of event data to additional data. For example, if the event data includes a client identifier, then the service 310 may maintain a table or file that associates particular bill identifiers with particular account identifiers, and the mapping 350 may return a particular account identifier when supplied with a particular bill identifier. Based (at least in part) on this additional data, the system 150 may perform sub-task to task assignment 170. For example, by using one or more bill identifiers in event messages 135A-135N to obtain a corresponding account identifier from the service 310, the system 150 may assign the sub-tasks for those event messages to a higher-level task of generating an invoice with the particular account identifier.

Figure 4:
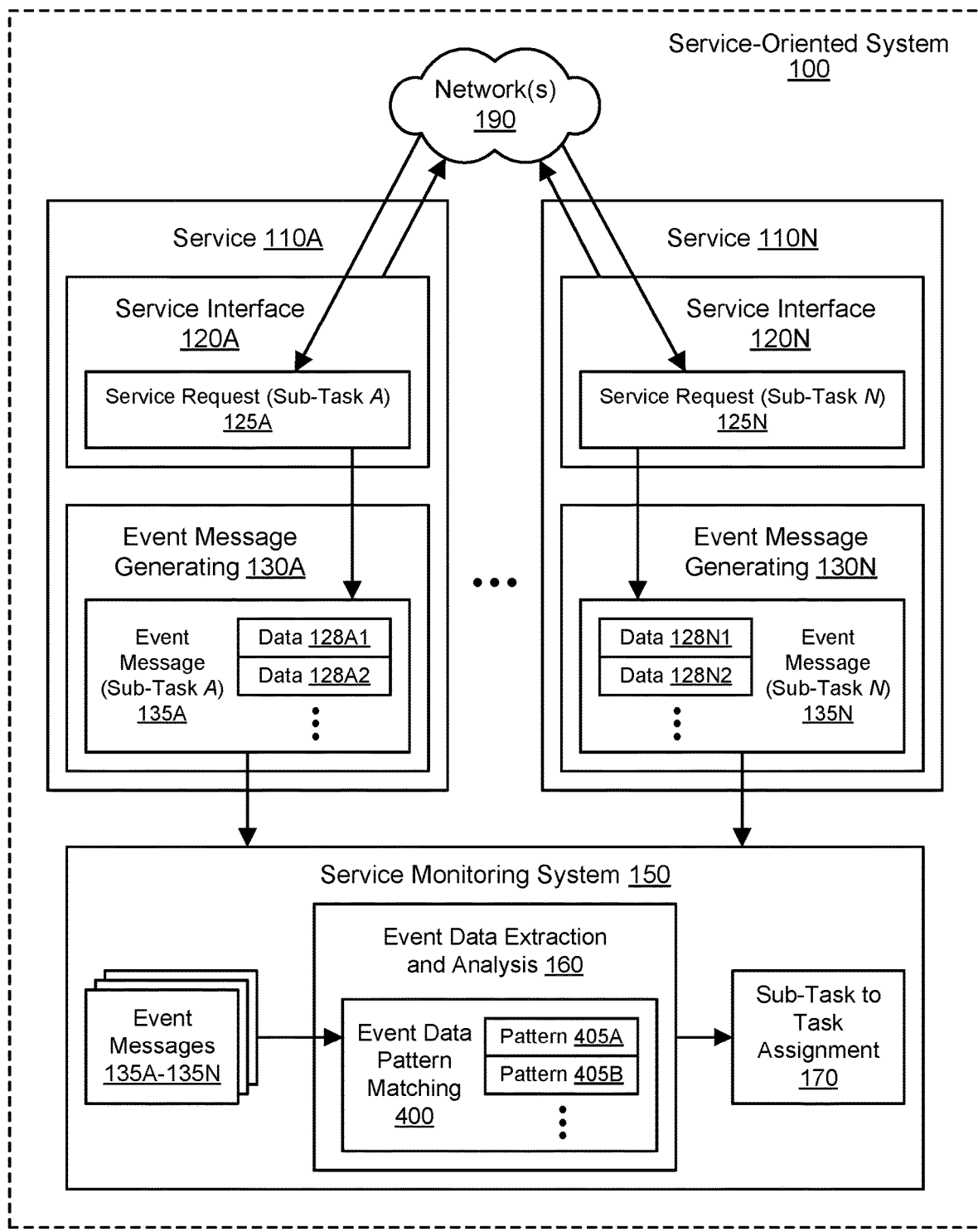
FIG. 4 illustrates further aspects of the example system environment for tracing service interactions without global transaction identifiers, including the use of pattern matching for assignment of sub-tasks to higher-level tasks, according to some embodiments.

FIG. 4 illustrates further aspects of the example system environment for tracing service interactions without global transaction identifiers, including the use of pattern matching for assignment of sub-tasks to higher-level tasks, according to some embodiments. As discussed above, the event data extraction and analysis 160 may apply domain-specific or task-specific logic to extract relevant elements of data from event messages. In some embodiments, the event data extraction and analysis 160 may match elements of the data using patterns associated with a data model of the higher-level task. As shown in FIG. 4, the system 150 may include a component 400 for event data pattern matching. The pattern matching 400 may have knowledge of various patterns such as pattern 405A, pattern 405B, and so on. A particular pattern may be domain-specific or task-specific. A domain-specific or task-specific pattern may be derived from the data model of a type or category of higher-level task. For example, the event data extraction and analysis 160 may use a different pattern for one higher-level task type of building web pages than for another higher-level task type of generating invoices for consumption of computing resources in a cloud provider network. Based (at least in part) on knowledge of the data model for a particular task type, the event data extraction and analysis 160 may use the pattern matching 400 look for particular types of data at particular locations within event messages. For example, if services 110A and 110N are known to be frequently involved in generating invoices for computing resource usage, then the event data pattern matching 400 may expect to find invoice identifiers and/or client account identifiers at particular locations in the event messages 135A and 135N. In some embodiments, the pattern matching 400 may use regular expressions to identify and extract relevant elements of data from event messages 135A-135N.

Figure 5:
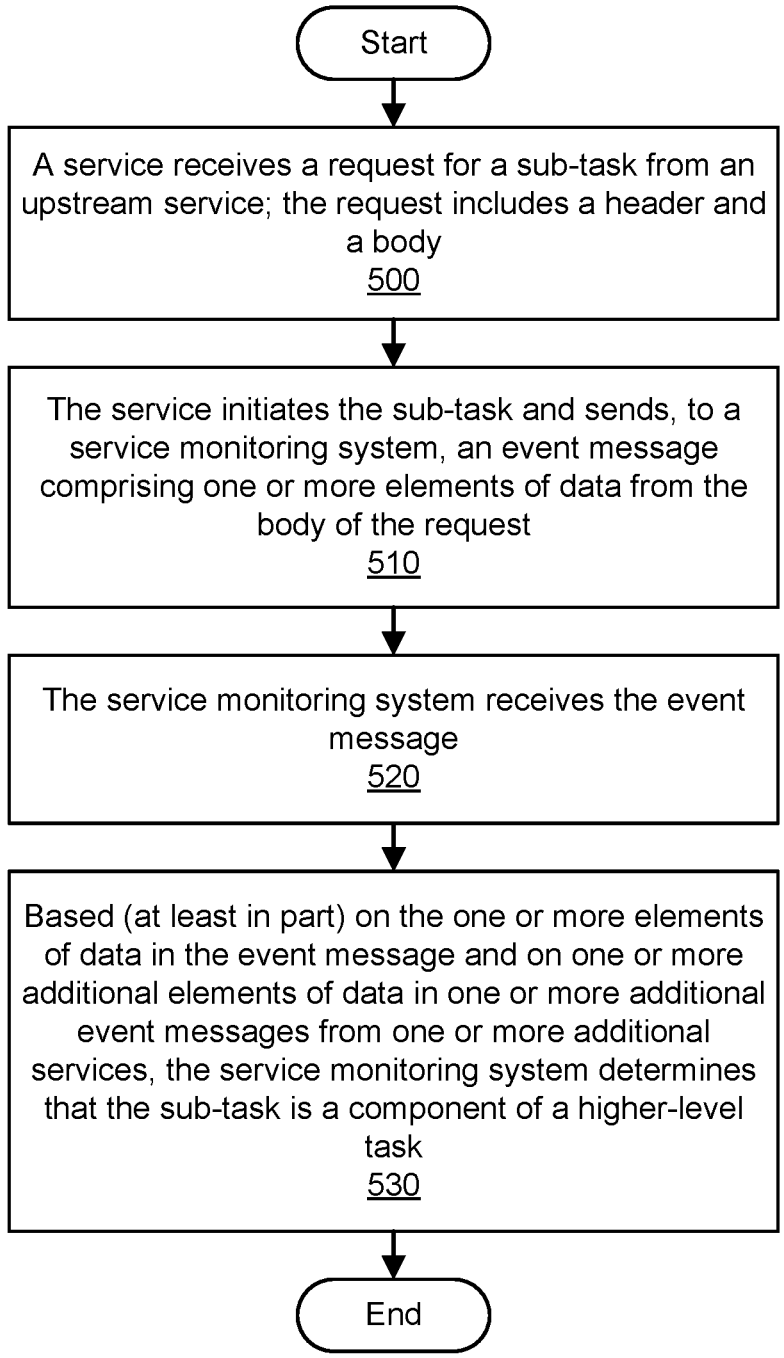
FIG. 5 is a flowchart illustrating a method for tracing service interactions without global transaction identifiers, according to some embodiments.

FIG. 5 is a flowchart illustrating a method for tracing service interactions without global transaction identifiers, according to some embodiments. As shown in 500, a service may receive a request for a sub-task from an upstream service. The sub-task may be a component of a higher-level task, and a service monitoring system may use one or more event messages to determine the link between the sub-task and the higher-level task. The service request may include a header and a body. The header may include routing information for the request, e.g., identifiers and/or addresses of the sending service (or a particular service host) and/or the recipient service (or a particular service host). In some embodiments, the header may include a global transaction identifier that originates with a root request at an upstream service. However, a service monitoring system may ignore such a global transaction identifier (if present) or assume that the identifier is not present in all service requests. The body of the service request may include a payload of the request, e.g., data usable as input to the requested sub-task. The body may include one or more elements of data. For example, the body may include data identifying a client account associated with the sub-task (and/or the corresponding higher-level task), data identifying a transaction associated with the sub-task (and/or the corresponding higher-level task), data identifying a category of sub-tasks associated with a category of higher-level tasks, data identifying a timestamp associated with the sub-task (and/or the corresponding higher-level task), and so on.

As shown in 510, the service may initiate execution of the requested sub-task. The service may also send an event message to a service monitoring system. In some embodiments, a service may generate an event message representing initiation of a sub-task when a request for a sub-task is received or when the service initiates the sub-task. In some embodiments, a service may generate an event message representing completion of the sub-task when the service completes the sub-task. An event message may include data from the body of the service request for the corresponding sub-task but not necessarily data from the header of the service request. For example, the event message may include data identifying a client account associated with the sub-task and/or higher-level task, data identifying a transaction associated with the sub-task and/or higher-level task, data identifying a category of sub-tasks associated with a category of higher-level tasks, data identifying a timestamp associated with the sub-task and/or higher-level task, and so on. In some embodiments, the event message may not include a global transaction identifier. In some embodiments, the event message may include one or more elements of data from the header of the corresponding service request, potentially including a global transaction identifier, but the service monitoring system may not use a global transaction identifier from the header to perform assignment of sub-tasks to higher-level tasks even if the identifier is present in the event message.

As shown in 520, the service monitoring system may receive the event message generated by the service. The event message may be generated for the benefit of one or more downstream services, e.g., to assist the downstream services in performing their respective tasks. However, the service monitoring system may also obtain the event message, e.g., by subscribing to an event publishing service. Similarly, the service monitoring system may receive one or more additional event messages generated by one or more additional services. The one or more additional event messages may be prompted by one or more additional service requests for one or more additional sub-tasks.

As shown in 530, the service monitoring system may determine that the sub-task is a component of a particular higher-level task based (at least in part) on one or more elements of data extracted from the body of the event message. In some embodiments, in performing the operation shown in 530, the service monitoring system may apply domain-specific or task-specific logic to extract relevant elements of data from event messages. The domain-specific or task-specific logic may be derived from the data model of a type or category of higher-level task. For example, the service monitoring system may use different logic for one higher-level task type of building web pages than for another higher-level task type of generating invoices for consumption of computing resources in a cloud provider network. Based (at least in part) on knowledge of the data model for a particular task type, the service monitoring system may look for particular types of data at particular locations within the event message. In some embodiments, in performing the operation shown in 530, the service monitoring system may match elements of the data using patterns associated with a data model of the higher-level task. In some embodiments, in performing the operation shown in 530, the service monitoring system may transform one or more elements of data from an event message to identify the corresponding higher-level task. In some embodiments, in performing the operation shown in 530, the service monitoring system may combine two or more elements of data from an event message to identify the corresponding higher-level task. For example, a combination of a client account identifier and a timestamp may be used to uniquely associate a particular set of sub-tasks with an instance of a higher-level task. In some embodiments, in performing the operation shown in 530, the service monitoring system may reference an external data source (e.g., another service) to obtain additional data that can be used to assign sub-tasks to a higher-level task.

In some embodiments, in performing the operation shown in 530, the service monitoring system may determine that the sub-task is a component of a particular higher-level task based (at least in part) on one or more additional elements of data extracted from the bodies of the one or more additional event messages. In some embodiments, in performing the operation shown in 530, the service monitoring system may determine that the one or more additional sub-tasks are also components of the particular higher-level task based (at least in part) on the one or more elements of data extracted from the body of the event message and/or the one or more additional elements of data extracted from the bodies of the one or more additional event messages. Based on the extracted event data, the service monitoring system may assign particular sub-tasks to particular higher-level tasks. By analyzing event messages emitted by services that do not necessarily propagate a global transaction identifier to other services, the service monitoring system may enable the progress of tasks (e.g., long-running tasks) to be monitored.

Illustrative Computer System

Figure 6:
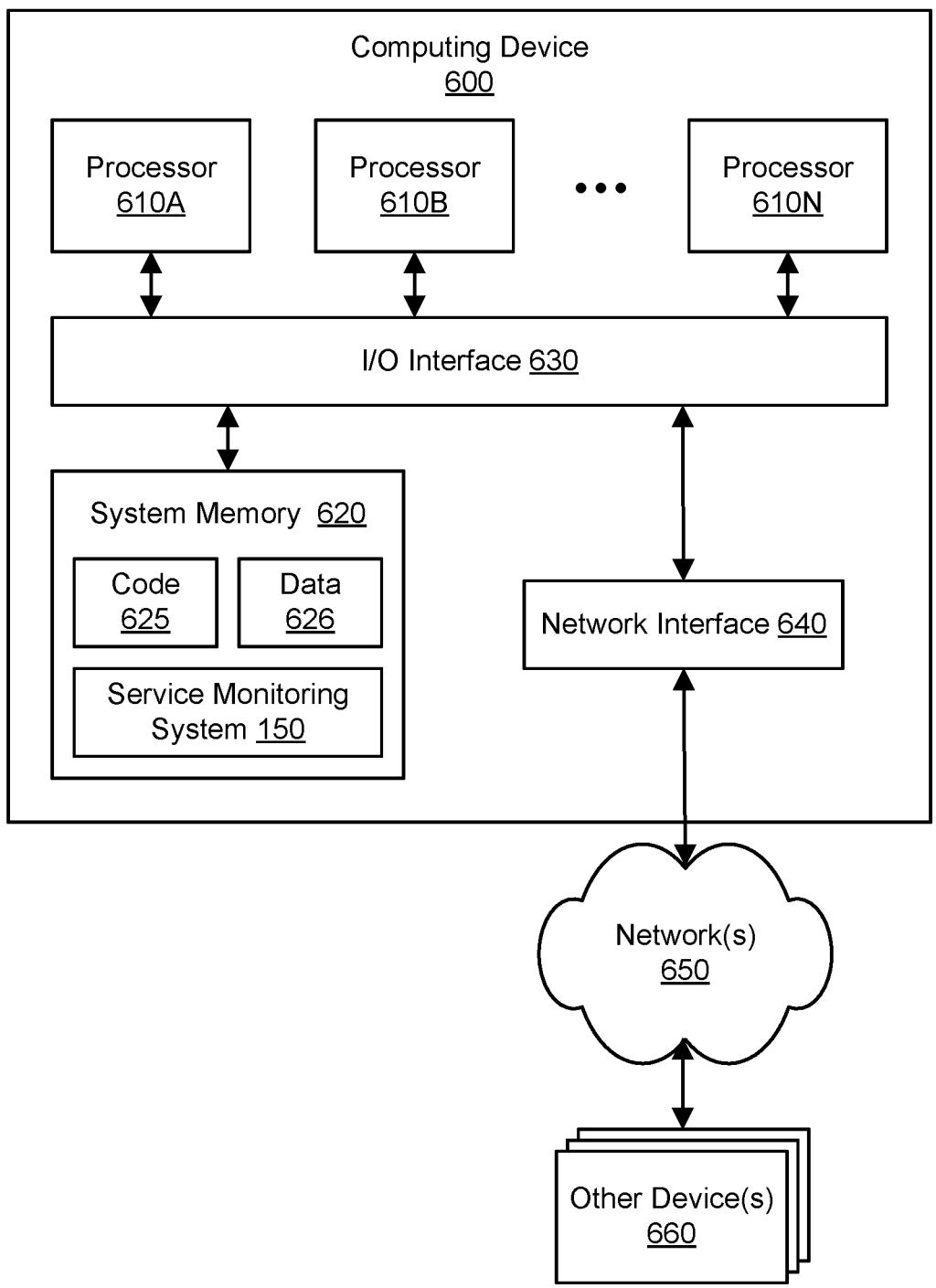
FIG. 6 illustrates an example of a computing device that may be used in some embodiments.

In at least some embodiments, a computer system that implements a portion or all of one or more of the technologies described herein may include a general-purpose computer system that includes or is configured to access one or more computer-readable media. FIG. 6 illustrates such a computing device 600. In the illustrated embodiment, computing device 600 includes one or more processors 610 coupled to a system memory 620 via an input/output (I/O) interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may include any suitable processors capable of executing instructions. For example, in various embodiments, processors 610 may be processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store program instructions and data accessible by processor(s) 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 620 as code (i.e., program instructions) 625 and data 626. For example, the system memory 620 may store code and data that implement the service monitoring system 150.

In one embodiment, I/O interface 630 may be configured to coordinate I/O traffic between processor 610, system memory 620, and any peripheral devices in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computing device 600 and other devices 660 attached to a network or networks 650. In various embodiments, network interface 640 may support communication via any suitable wired or wireless general data networks, such as types of Ethernet network, for example. Additionally, network interface 640 may support communication via telecommunications/telephony networks such as analog voice networks or digital fiber communications networks, via storage area networks such as Fibre Channel SANs, or via any other suitable type of network and/or protocol.

In some embodiments, system memory 620 may be one embodiment of at least one computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 600 via I/O interface 630. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 600 as system memory 620 or another type of memory. Further, a computer-readable medium may include transmission media or signals such as electrical, electromagnetic, or digital signals, conveyed via a communication medium such as a network and/or a wireless link, such as may be implemented via network interface 640. The described functionality may be implemented using one or more non-transitory computer-readable storage media storing program instructions that are executed on or across one or more processors. Portions or all of multiple computing devices such as that illustrated in FIG. 6 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. When used in the claims, the term "or" is used as an inclusive or and not as an exclusive or. For example, the phrase "at least one of x, y, or z" means any one of x, y, and z, as well as any combination thereof.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    one or more computing devices comprising respective processors and memory and configured to implement the service monitoring system, wherein the service monitoring system is configured to:
        receive an event message from a service in a service-oriented system, wherein the event message comprises one or more elements of data from a service request received by the service from an upstream service in the service-oriented system, and wherein the service initiates a task associated with the service request;
        receive an additional event message from an additional service in the service-oriented system, wherein the additional event message comprises one or more additional elements of data from an additional service request received by the additional service, and wherein the additional service initiates an additional task associated with the additional service request;
        determine, without using a global transaction identifier of the service request and based at least in part on both:
            the one or more elements of data in the event message received from the service, and
            the one or more additional elements of data in the additional event message received from the additional service:
                the task initiated by the service and the additional task initiated by the additional service are different components of a same higher-level task; and
            provide metrics or other information for the task and the additional task of the higher-level task.

2. The system as recited in claim 1, wherein the service monitoring system is further configured to:
    match the one or more elements of data in the event message using one or more patterns associated with a data model of the higher-level task, wherein the service monitoring system determines that the task and the additional task are components of the higher-level task based at least in part on the one or more patterns.

3. The system as recited in claim 1, wherein the service monitoring system is further configured to:
    receive, from a data source external to the service monitoring system, additional data associated with the one or more elements of data in the event message, wherein the service monitoring system determines that the task and the additional task are components of the higher-level task based at least in part on the additional data associated with the one or more elements of data in the event message.

4. The system as recited in claim 1, wherein the service monitoring system determines that the task is associated with the higher-level task without using a header of the service request.

5. The system as recited in claim 1 wherein the one or more elements of data in the event message and the one or more additional elements of data in the additional event message comprise an account identifier of a client, and wherein the service monitoring system determines that the task is associated with the higher-level task based at least in part on the account identifier.

6. The system as recited in claim 1, wherein the one or more elements of data in the event message and the one or more additional elements of data in the additional event message comprise a timestamp, and wherein the service monitoring system determines that the task is associated with the higher-level task based at least in part on the timestamp.

7. A method, comprising:
    receiving, by a service monitoring system, an event message from a service in a service-oriented system, wherein the event message comprises one or more elements of data from a service request received by the service from an upstream service in the service-oriented system, and wherein the service initiates a task associated with the service request;
    receiving, by the service monitoring system, an additional event message from an additional service in the service-oriented system, wherein the additional event message comprises one or more additional elements of data from an additional service request received by the additional service, and wherein the additional service initiates an additional task associated with the additional service request;
    determining, by the service monitoring system, without using a global transaction identifier of the service request and based at least in part on both:
        the one or more elements of data in the event message received from the service, and
        the one or more additional elements of data in the additional event message received from the additional service:

the task initiated by the service and the additional task initiated by the additional service are different components of a same higher-level task; and providing, by the service monitoring system, metrics or other information for the task and the additional task of the higher-level task.

8. The method as recited in claim 7, further comprising:
matching, by the service monitoring system, the one or more elements of data in the event message using one or more patterns associated with a data model of the higher-level task, wherein the service monitoring system determines that the task is associated with the higher-level task based at least in part on the matching.

9. The method as recited in claim 7, wherein the service monitoring system determines that the task is associated with the higher-level task based at least in part on a combination of a plurality of data elements in the event message.

10. The method as recited in claim 7, further comprising:
receiving, by the service monitoring system from an additional service in the service-oriented system, additional data associated with the one or more elements of data in the event message, wherein the service monitoring system determines that the task is associated with the higher-level task based at least in part on the additional data associated with the one or more elements of data in the event message.

11. The method as recited in claim 7, wherein the one or more elements of data in the event message and the one or more additional elements of data in the additional event message comprise an account identifier of a client, and wherein the service monitoring system determines that the task is associated with the higher-level task based at least in part on the account identifier.

12. The method as recited in claim 7, wherein the one or more elements of data in the event message and the one or more additional elements of data in the additional event message comprise a timestamp, and wherein the service monitoring system determines that the task is associated with the higher-level task based at least in part on the timestamp.

13. The method as recited in claim 7, further comprising:
determining, by the service monitoring system based at least in part on the one or more elements of data in the event message and the one or more additional elements of data in the additional event message, a path of requests for the higher-level task among the upstream service, the service, and the additional service.

14. One or more non-transitory computer-readable storage media storing program instructions that, when executed on or across one or more processors, perform:
receiving, by a service monitoring system, an event message from a service in a service-oriented system, wherein the event message comprises one or more elements of data from a service request received by the service from an upstream service in the service-oriented system, and wherein the service initiates a task associated with the service request;
receiving, by the service monitoring system, an additional event message from an additional service in the service-oriented system, wherein the additional event message comprises one or more additional elements of data from an additional service request received by the additional service, and wherein the additional service initiates an additional task associated with the additional service request;
determining, by the service monitoring system, without using a global transaction identifier of the service request and based at least in part on both:
the one or more elements of data in the event message received from the service, and
the one or more additional elements of data in the additional event message received from the additional service:
the task initiated by the service and the additional task initiated by the additional service are different components of a same higher-level task; and
providing, by the service monitoring system, metrics or other information for the task and the additional task of the higher-level task.

15. The one or more non-transitory computer-readable storage media as recited in claim 14, further comprising additional program instructions that, when executed on or across the one or more processors, perform:
matching, by the service monitoring system, the one or more elements of data in the event message using one or more patterns associated with a data model of the higher-level task, wherein the service monitoring system determines that the task is associated with the higher-level task based at least in part on the one or more patterns.

16. The one or more non-transitory computer-readable storage media as recited in claim 14, wherein the service monitoring system determines that the task is associated with the higher-level task based at least in part on a combination of a plurality of data elements extracted from the service request.

17. The one or more non-transitory computer-readable storage media as recited in claim 14, further comprising additional program instructions that, when executed on or across the one or more processors, perform:
obtaining, by the service monitoring system from an external data repository, additional data correlated with the one or more elements of data in the event message, wherein the service monitoring system determines that the task is associated with the higher-level task based at least in part on the additional data associated with the one or more elements of data in the event message.

18. The one or more non-transitory computer-readable storage media as recited in claim 14, further comprising additional program instructions that, when executed on or across the one or more processors, perform:
determining, by the service monitoring system based at least in part on one or more additional elements of data in an additional event message from the upstream service, that an upstream task at the upstream service is associated with the higher-level task.

19. The one or more non-transitory computer-readable storage media as recited in claim 14, further comprising additional program instructions that, when executed on or across the one or more processors, perform:
generating, by the service monitoring system based at least in part on the one or more elements of data in the event message and the one or more additional elements of data in the additional event message, a visualization of a path of requests for the higher-level task among the upstream service, the service, and the additional service.

* * * * *